United States Patent
Tsirkin

(10) Patent No.: US 11,030,112 B2
(45) Date of Patent: Jun. 8, 2021

(54) ENHANCED ADDRESS SPACE LAYOUT RANDOMIZATION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 55 days.

(21) Appl. No.: 15/989,972

(22) Filed: May 25, 2018

(65) Prior Publication Data

US 2019/0361815 A1  Nov. 28, 2019

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/1008* (2013.01); *G06F 2212/657* (2013.01)

(58) Field of Classification Search
CPC ............. G06F 12/1009; G06F 12/1027; G06F 2212/1008
USPC ........................................................ 711/207
See application file for complete search history.

(56) References Cited

U.S. PATENT DOCUMENTS

| | | | | |
|---|---|---|---|---|
| 6,105,113 A | * | 8/2000 | Schimmel ........... | G06F 12/1027 711/144 |
| 9,619,672 B2 | | 4/2017 | Mittal | |
| 2011/0307888 A1 | * | 12/2011 | Raj ..................... | G06F 9/45558 718/1 |
| 2016/0092675 A1 | * | 3/2016 | Vidrine .................. | G06F 21/52 726/22 |
| 2018/0032447 A1 | * | 2/2018 | Kaplan ............... | G06F 9/45558 |
| 2019/0004972 A1 | * | 1/2019 | Bear ..................... | G06F 12/145 |

OTHER PUBLICATIONS

Lazarus: Practical Side-channel Resilient Kernel-Space Randamization by David Gens, Orlando Arias, Dean Sullivan, Christopher Liebchen, Yier Jin and Ahmad-Reza Sadeghi; http://jin.ece.ufl.edu/papers/RAID17.pdf; retrieved Feb. 16, 2018 (21 pages).

Alex Ionescu's Blog; Archive for May 2016; Owning the Image Object File Format, the Compiler Toolchain, and the Operating System: Solving Intractable Performance Problems Through Vertical Engineering; Closing Down Another Attack Vector, http://www.alex-ionescu.com/?m=201605; May 6, 2016; retrieved Feb. 16, 2018; pp. 1-6.

(Continued)

*Primary Examiner* — Gautam Sain
(74) *Attorney, Agent, or Firm* — K&L Gates LLP

(57) ABSTRACT

Enhanced address space layout randomization is disclosed. For example, a memory includes first and second memory addresses of a plurality of memory addresses, where at least one of the plurality of memory addresses is a decoy address. A memory manager executes on a processors to generate a page table associated with the memory, which includes a plurality of page table entries. Each page table entry in the plurality of page table entries is flagged as in a valid state. The page table is instantiated with first and second page table entries of the plurality of page table entries associated with the first and second memory addresses respectively. A plurality of unused page table entries of the plurality of page table entries, including a decoy page table entry, is associated with a decoy address.

20 Claims, 9 Drawing Sheets

200

| | Entry ID | Validity | Access Rights | Address |
|---|---|---|---|---|
| Mapped V. Add. 260 | Entry ID 210 | Validity 220 | Access Rights 230A | Address 240 |
| Mapped V. Add. 261 | Entry ID 211 | Validity 221 | Access Rights 231A | Address 241 |
| Decoy V. Add. 262 | Entry ID 212 | Validity 222 | Access Rights 232A | Decoy Add. 252A |
| Mapped V. Add. 263 | Entry ID 213 | Validity 223 | Access Rights 233B | Address 243 |
| Unmapped V. Add. 264 | Entry ID 214 | Validity 224 | Access Rights 234A | Decoy Add. 252B |
| Unmapped V. Add. 265 | Entry ID 215 | Validity 225 | Access Rights 235A | Decoy Add. 252C |
| Unmapped V. Add. 266 | Entry ID 216 | Validity 226 | Access Rights 236A | Decoy Add. 252D |
| Unmapped V. Add. 267 | Entry ID 217 | Validity 227 | Access Rights 237A | Decoy Add. 252E |

Page Table 150

(56) References Cited

OTHER PUBLICATIONS

Virtual Memory in the 1A-64 Linux Kernel; Page Fault Handling/Virtual Memory in the 1A-64 Linux Kernel/InformIT; by Stephanie Eranian and David Mosberger; Nov. 8, 2002; pp. 1-9.
Prefetch Side-Channel Attacks: Bypassing SMAP and Kernel ASLR by Daniel Gruss, Clementine Maurice, Anders Fogh, Moritz Lipp and Stefan Mangard; 2016; (12 pages).
KASLR is Dead: Long Live KASLR by Daniel Gruss, Moritz Lipp, Michael Schwartz, Richard Fellner, Clementine Maurice and Stefan Mangard; https://gruss.cc/files/kaiser.pdf; retrieved Feb. 16, 2018 (16 pages).

* cited by examiner

ENHANCED ADDRESS SPACE LAYOUT RANDOMIZATION

BACKGROUND

The present disclosure generally relates to preventing unauthorized access to memory addresses in computer systems. If a malicious actor determines the physical location in memory of critical system components such as system libraries with elevated access rights, the malicious actor may utilize the location data to target attacks to execute code with elevated rights thereby bypassing the security access controls on a system. A commonly implemented security feature is the randomization of the memory addresses where a given component is loaded into memory, especially for kernel components via address space layout randomization ("ASLR"). Kernel address space layout randomization is commonly referred to as ("KASLR").

SUMMARY

The present disclosure provides a new and innovative system, methods and apparatus for enhanced address space layout randomization. In an example, a memory includes a first memory address and a second memory address of a plurality of memory addresses, where at least one of the plurality of memory addresses is a decoy address. A memory manager executes on one or more processors to generate a page table associated with the memory, where the page table includes a plurality of page table entries. Each page table entry in the plurality of page table entries is flagged as in a valid state. The page table is instantiated with a first page table entry and a second page table entry of the plurality of page table entries associated with the first memory address and the second memory address respectively. A plurality of unused page table entries of the plurality of page table entries, including a decoy page table entry, is associated with the decoy address.

Additional features and advantages of the disclosed method and apparatus are described in, and will be apparent from, the following Detailed Description and the Figures.

DETAILED DESCRIPTION OF EXAMPLE EMBODIMENTS

Figure 1:
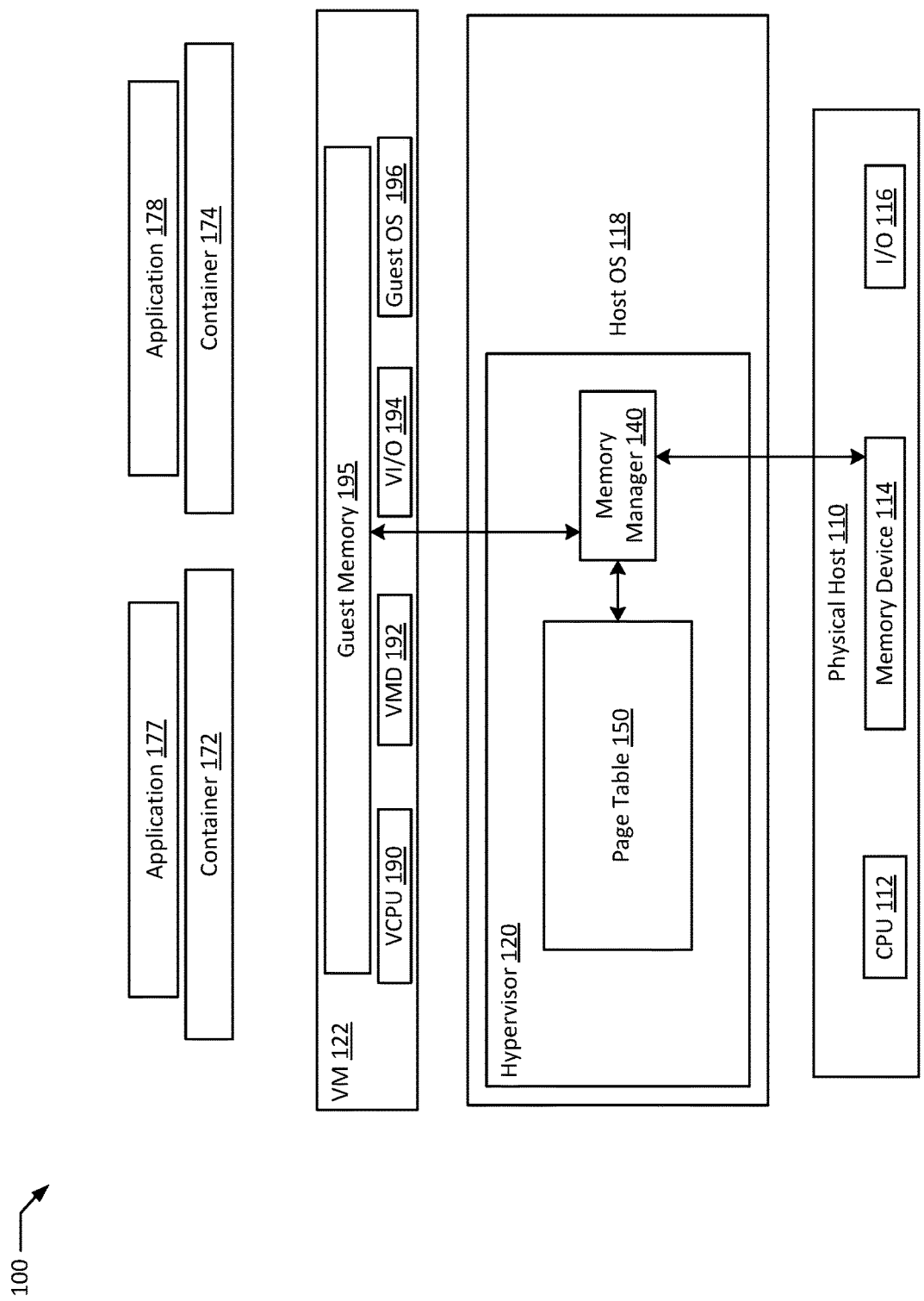
FIG. 1 is a block diagram of an enhanced address space layout randomization system according to an example of the present disclosure.

In computer systems, many executable programs are typically built by incorporating reusable components such as shared libraries to carry out commonly performed computing tasks. In many implementations, certain shared components may be implemented requiring elevated access, for example, components that provide interfaces directly to physical computing hardware and components shared by multiple users of the computing system such as kernel components. In certain examples these shared components, when accessed and/or executed, may temporarily grant elevated access to a user to perform the shared component's designed computing function.

In many computer systems, physical hardware may host isolated guests such as virtual machines and/or containers. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In sharing physical computing resources, isolated guests and/or a hypervisor controlling them, may also have access to shared components of the underlying physical host. However, such access is typically restricted through a virtualization manager such as a hypervisor to ensure that virtual environments remain segregated and to prevent unauthorized access to other virtual environments on the same physical host, or to the physical host itself.

In typical computer systems, there may be more data referenced by executing applications (both applications executing on physical hardware and those in virtualized guests on the physical hardware) than there is physical memory available on the system. Typically, memory virtualization is implemented to allow physical memory to be shared among these various processes. For example, data may be loaded to physical memory when it is needed for a program to execute, and then moved to slower storage such as hard disk when the data is not being accessed. In an example, memory paging is implemented to track the virtual addresses of the data of executing applications.

A commonly exploited security flaw in computer systems relates to exploiting buffer overflow events (e.g., return-oriented-programming attacks). A malicious actor may purposefully overrun a fixed sized buffer to place data in an area in memory that should not have been accessible to the malicious actor's programming. If the location in memory of certain routinely used shared libraries is discoverable, return addresses in the call stack of the library may be replaced with a pointer to an address of alternative code placed in memory by the malicious actor. A typical scenario may involve discovering the location in memory of a shared library executing with higher privileges than the malicious actor has been able to obtain access to on the computer system, and then to redirect certain common functionality of the library to replacement code of the malicious actor's choosing by deliberately triggering a buffer overflow event that overflows onto the privileged library from a non-privileged location in memory. ASLR impedes these types of attacks by randomizing the locations in virtual memory for shared libraries and parts of shared libraries each time the respective shared library is loaded into memory. However, in many cases, commonly used code with high privileges, such as certain kernel components, may be loaded into memory once around boot up time of the system, and stay loaded in memory until the system is started. KASLR is a form of ASLR through which the address in virtual memory of kernel components at startup time is randomized, typically implemented via shifting the first used virtual memory address away from a predictable initial location, and then utilizing a calculated offset to determine the virtual memory addresses of subsequently used blocks of memory for additional kernel components loaded to memory.

A flaw in KASLR, however, is that the calculations for offsets for used memory locations by the kernel are generated during kernel build-time and never change. Therefore, while KASLR may make it take longer for a malicious actor to gain access to exploit a system, once a limited number of reference points (e.g., virtual memory addresses) are identified such that the randomization added by KASLR is defeated, any underlying exploitable features of a system so protected may be vulnerable. Typical KASLR implementations select a specific starting point in memory to load kernel modules to memory based on certain randomization calculations, and all other possible starting locations are flagged as invalid in a relevant page table of memory addresses. Knowledge of kernel memory addresses can thus be exploited to bypass KASLR. To prevent attacks, system interfaces exposing the kernel addresses to unprivileged processes (e.g., userspace processes) may be fixed or removed. However, not all interfaces are provided by software which may be relatively easily patched. Hardware interfaces known as hardware side-channels may also, in some circumstances, be used to directly or indirectly expose memory addresses including kernel space addresses to unprivileged users, and hardware exploits may not be easily fixed through software changes. Exploits targeting these hardware side channels commonly referred to as side-channel attacks, use differences in execution timing, power consumption, electromagnetic leaks, etc. to gain unauthorized information on computer systems. For example, timing differences between attempting to access cached memory addresses and uncached memory addresses may be used to determine whether a given address is valid and/or has been recently accessed. In particular, even though kernel memory addresses are typically not accessible to unprivileged processes (e.g., userspace processes), for some central processing unit ("CPU") types, a measurable difference in execution speed for certain instructions in userspace processes may be observed depending on whether a given memory address that the userspace process is attempting to access is or is not used (mapped) by the kernel due to virtual address translation information for those memory addresses being cached by the system. Measuring these timing differences allows KASLR protection to be defeated. This makes it possible for such a process to defeat the KASLR protection. After locating one or more locations, the known offset calculations may be utilized to discover exploitable components based on the relative locational relationships between the discovered memory addresses. An exploitable memory address may then be targeted for attack.

A known countermeasure to the kernel data being leaked to security exploits is Kernel Address Isolation to have Side channels Efficiently Removed ("KAISER"). In KAISER, kernel space and user space memory addresses are stored in separate page tables and contents of processor caches are also stored in separate memory addresses for kernel space and user spaces. Each time a context switch between user and kernel space occurs, the page tables and buffer caches are swapped as well. In the user space, all kernel space addresses are flagged as invalid, therefore preventing them from being cached and preventing timing differences from being exploited. However, because KAISER flushes translation caches in order to eliminate any timing differences in accessing kernel space addresses, KAISER imposes a penalty of up to 33% extra CPU cycles as compared to translating and accessing cached memory addresses in the same system without KAISER.

The present disclosure hardens KASLR implementations against leaking out the memory addresses of kernel components through enhanced address space layout randomization, without incurring the performance penalties of KAISER. For example, in enhanced ASLR, rather than invalidating kernel addresses in user space, both user and kernel page tables are initialized with a significant proportion of the unused page table entries in the respective page tables flagged as valid. In some examples, a page table may have a majority of its page table entries flagged as valid even if these entries are not actively in use. The unused page table entries are instead associated with a decoy memory address that catches attempted unauthorized access events. Because unused page table entries are flagged as valid, there is no timing difference to exploit since attempting to access an unused or unavailable address would still result in the cache hit response timing based on the decoy address. Even where only a portion of the unused addresses are directed towards the decoy address, the proportion of false positives generated may likely catch attempted unauthorized access well before an actual security breach. The cost of enhanced ASLR comes from larger page tables which take slightly longer to instantiate, a "wasted" cache entry for the decoy address, and also more storage space used for page tables since normally page table entries would only be created for valid pages. However, in modern computer systems, the extra storage space may typically be negligible and in many typical execution scenarios, slightly slower instantiation is preferable over consistent execution delays during processing (e.g., via implementing KAISER). Instead of controlling access and mapping memory via valid and invalid page table entries, in enhanced ASLR, entries may typically stay flagged as valid, and instead an address that becomes mapped may have a page table entry updated from the decoy address to the mapped address, while a memory address that needs to be unmapped may have its corresponding page table entry updated to refer to the decoy address. As each page table entry is therefore associated with a valid memory address (e.g., a data address or the decoy address), timing differences between "valid" and "invalid" addresses are eliminated. Combined with known methods of implementing ASLR to randomize virtual memory addresses, an attacker would need a significant amount of time to attempt to find an exploitable memory location by trying to execute code against random locations without any timing feedback. Such failed attempts may typically be configured to cause the attacking software to crash based on attempting to access the decoy address, further slowing down any brute force attacks. Also, unlike in typical ASLR implementations, access attempts to the decoy address may also be flagged for further security countermeasures, thereby trapping the attacker. In systems where kernel and user space context switches occur often (e.g., physical hosts of many virtualized environments), enhanced ASLR presents significant memory lookup performance advantages over security countermeasures such as KAISER because CPU caches including TLBs may be utilized without extraneous cache flushes that impede performance.

FIG. 1 is a block diagram of an enhanced address space layout randomization system according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may run one or more isolated guests, for example, VM 122, and containers 172 and 174. In an example, any of containers 172 and 174 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VM 122 may be a VM executing on physical host 110. In an example, containers 172 and 174 may execute on VM 122. In an example, memory manager 140 may execute independently, as part of host OS 118, as part of hypervisor 120, or within a virtualized guest. In an example, any of containers 172 and 174 may be executing directly on either of physical host 110 without a virtualized layer in between. In an example, isolated guests may be further nested in other isolated guests. For example, VM 122 may host containers (e.g., containers 172 and 174). In addition, containers and/or VMs may further host other guests necessary to execute their configured roles (e.g., a nested hypervisor or nested containers). For example, a VM (e.g., VM 122) and/or a container (e.g., containers 172 or 174) may further host a Java® Virtual Machine ("JVM") if execution of Java® code is necessary.

System 100 may run one or more VMs (e.g., VM 122), by executing a software layer (e.g., hypervisor 120) above the hardware and below the VM 122, as schematically shown in FIG. 1. In an example, the hypervisor 120 may be a component of respective host operating system 118 executed on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to VM 122 as devices, including virtual central processing unit ("VCPU") 190, virtual memory devices ("VIVID") 192, virtual input/output ("VI/O") device 194, and/or guest memory 195. In an example, a container may execute directly on host OSs 118 without an intervening layer of virtualization.

In an example, a VM 122 may be a virtual machine and may execute a guest operating system 196 which may utilize the underlying VCPU 190, VIVID 192, and VI/O 194. One or more isolated guests (e.g., containers 172 and 174) may be running on VM 122 under the respective guest operating system 196. Processor virtualization may be implemented by the hypervisor 120 scheduling time slots on physical processors 112 such that from the guest operating system's perspective those time slots are scheduled on a virtual processor 190.

VM 122 may run on any type of dependent, independent, compatible, and/or incompatible applications on the underlying hardware and host operating system 118. In an example, containers 172 and 174 running on VM 122 may be dependent on the underlying hardware and/or host operating system 118. In another example, containers 172 and 174 running on VM 122 may be independent of the underlying hardware and/or host operating system 118. In an example, containers 172 and 174 running on VM 122 may be compatible with the underlying hardware and/or host operating system 118. Additionally, containers 172 and 174 running on VM 122 may be incompatible with the underlying hardware and/or OS. The hypervisor 120 may manage memory for the host operating system 118 as well as memory allocated to the VM 122 and guest operating system 196 such as guest memory 195 provided to guest OS 196.

In an example, any form of suitable network for enabling communications between computing devices, for example, a public network (e.g., the Internet), a private network (e.g., a local area network (LAN) or wide area network (WAN)), or a combination thereof may be employed to connect physical host 110, VM 122, and/or containers 172 and 174 to other computer systems. In an example, memory manager 140 may be a component interface between CPU 112 and memory device 114, managing access to memory device 114 by physical host 110, VM 122, and/or containers 172 and 174 (e.g., through hypervisor 120). In various examples, memory manager 140 may be a physical hardware component, a software component, or a combination of both hardware and software. In an example, memory manager 140 may include and/or access one or more cache memory devices associated with CPU 112, including TLB caches. In an example, one or more page tables (e.g., page table 150) may provide virtual addresses (e.g., page table entries) that are mapped to memory addresses in memory device 114. In the example, memory manager 140 may provide an interface between page table 150 and memory device 114. In an example, memory manager 140 may further provide an interface between virtual memory devices (e.g., guest memory 195, VIVID 192) and memory device 114.

Figure 2A:
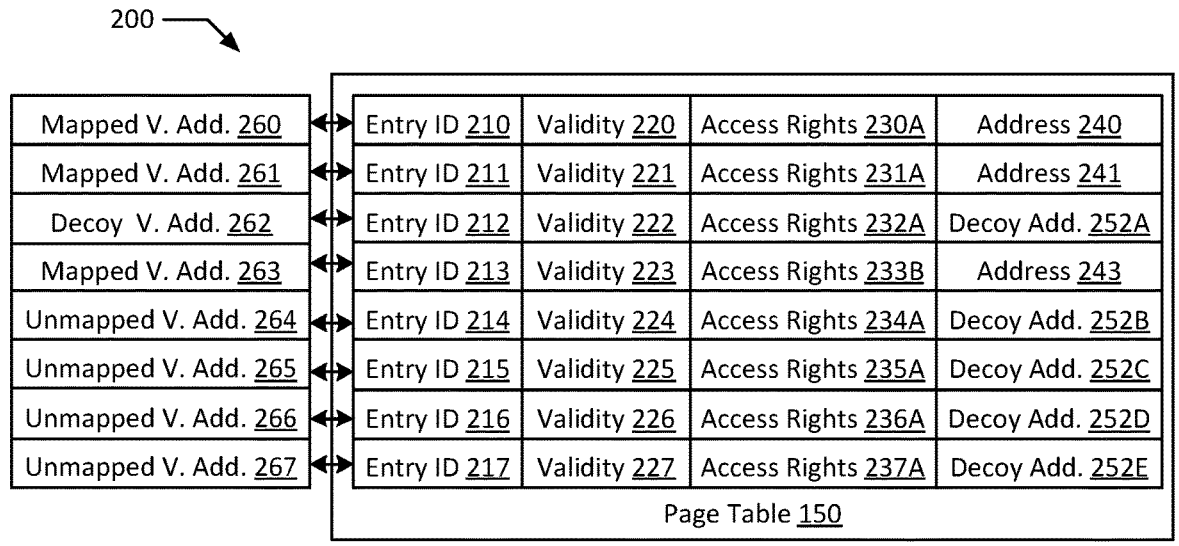
FIGS. 2A-B are block diagrams illustrating a page table in an enhanced address space layout randomization system according to an example of the present disclosure.
Figure 2B:
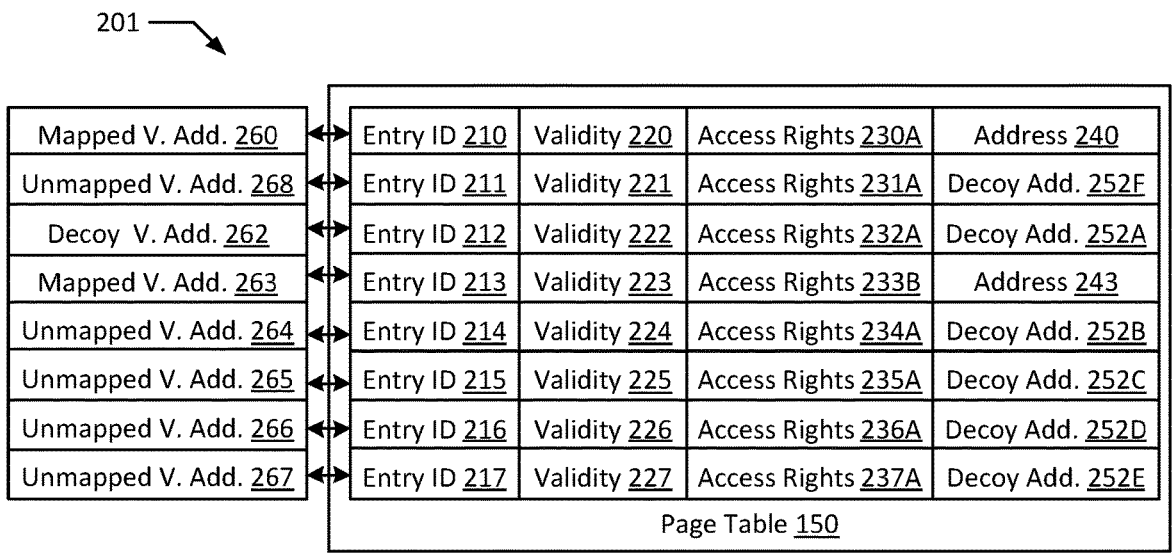

FIGS. 2A-B are block diagrams illustrating a page table in an enhanced address space layout randomization system according to an example of the present disclosure. Illustrated system 200 depicted in FIG. 2A depicts page table 150 at a first time, for example, shortly after page table 150 is instantiated. In an example, page table 150 may be associated with a particular access credential (e.g., user or kernel). In an example, page table 150 may be associated with a particular virtual guest (e.g., VM 122). In an example, page table 150 may be shared between different access credentials with access managed by access flags (e.g., access rights 230A-232A, 233B, and 234A-237A). In an example, page table 150 may be instantiated based on a request to allocate a virtual memory address (e.g., mapped virtual address 260, 261, 263, decoy virtual address 262). In an example, entry IDs 210-217 are unique identifiers for different pages of memory managed by page table 150. In an example, multiple page tables may be nested and/or interconnected with references, for example, where a page table has insufficient possible entries to address each physical memory location (e.g., memory block) available on a system. In an example, when space in memory is requested by an application, a virtual address (e.g., mapped virtual address 260, 261, 263) is assigned to the requested memory allocation which is associated to an available page table entry ID (e.g., entry IDs 210-217) and mapped to a physical memory location referenced by an address field (e.g., address 240, 241, 243, decoy addresses 252A-E) of page table 150. In an example, a virtual memory address (e.g., mapped virtual address 260, 261, 263) is mapped if it is associated with a physical memory location (e.g., physical memory addresses 240, 241, 243) storing application data, and unmapped if it is not associated with a data storing physical memory location. In such examples, decoy data stored in decoy addresses 252A-E is not considered application data even though an application may implement decoy addresses 252A-E, for example, through a memory allocation request for decoy virtual address 262. In an example, a specific decoy virtual address (e.g., decoy virtual address 262) is not required because decoy address 252A may be associated with alternative, unselected, potential virtual addresses for a mapped virtual address (e.g., mapped virtual address 260, 261, 263). In an example, page table 150 provides translation between a virtual address (e.g., mapped virtual address 260, 261, 263) and a corresponding physical memory address (e.g., address 240, 241, 243). In an example, the virtual memory address (e.g., mapped virtual address 260, 261, 263) of an allocated memory page is associated with a corresponding page table entry ID (e.g., entry IDs 210, 211, 213) of the allocated memory page with translation information (e.g., addresses 240, 241, 243) of the associated physical location in memory of the memory page.

In an example, page table 150 is initialized by first associating certain entry IDs with memory addresses (e.g., addresses 240, 241, 243 and decoy address 252A-E) as part of an initialization sequence of page table 150 (e.g., a boot sequence of VM 122), where a kernel of host operating system 118 allocates certain virtual memory addresses (e.g., mapped virtual address 260, 261, 263). In the example, mapped virtual address 260, 261, 263 may be virtual memory addresses of initial kernel components, including, for example, page table 150. In an example, a given memory allocation request may allocate a pseudo-random virtual memory address of a set of possible virtual memory addresses to a given component, for example, based on an ASLR calculation. In the example, different coefficients and variables fed into the calculation result in different virtual addresses being allocated for the component. In an example, when memory is requested for mapped virtual address 260, a plurality of other potential addresses could have been selected in place of mapped virtual address 260 based on alternative ASLR calculation outcomes (e.g., unmapped virtual addresses 264-267). In an example, each of these possible potential locations may be a target for a malicious actor to exploit, based on knowledge about ASLR implementations. In an example, unmapped virtual addresses 264-267 are not associated with any data being stored, since the data is actually stored to mapped virtual address 260. Therefore, associated entry IDs 214-217 are available for future memory allocation requests. However, in the example, when mapped virtual address 260 is associated with entry ID 210 and address 240, unmapped virtual addresses 264-267, which are alternative possible locations for the data of mapped virtual address 260, are associated with entry IDs 214-217. In the example, validity bits for entry IDs 210, and 214-217 are set to valid so that attempted access of the potential virtual addresses will be responded to as if they are storing valid data. In the example, entry IDs 214-217 are associated with decoy address 252B-E. Mapped virtual addresses 261 and 263 are associated with entry IDs 211 and 213 similarly to mapped virtual address 260. In an example, mapped virtual address 261 and/or 263 may also have one or more of unmapped virtual addresses 264-267 as a potential virtual address, along with other potential unmapped virtual addresses. In the example, these other potential unmapped virtual addresses are also associated with entry IDs in page table 150 pointed to the decoy address or other decoy addresses. Typically, there are numerous possible addresses for a given memory allocation request, and in some cases only a subset of the possible addresses may become associated with the decoy address, for example, to reduce mapping overhead and page table size. In an example, the more possible virtual addresses are associated with the decoy address, the higher the likelihood a malicious actor may find the decoy address rather than a mapped virtual address (e.g., mapped virtual address 260, 261, 263) on a given access attempt.

In an example, an access rights flag (e.g., access rights 230A-232A, 233B, and 234A-237A) may include read, write, and execute permissions for an associated entry ID (e.g., entry IDs 210-217) that may further be account and/or group specific. In an example, access rights 230A-232A and 234A-237A are initialized as requiring elevated access permissions. For example, access rights 230A-232A and 234A-237A may indicate that corresponding entry IDs 210-212 and 214-217 are only accessible to the kernel. In an example, access rights 233B may indicate that entry ID 213 is accessible to a user. In an example, addresses 240 and 241 referenced by entry ID 210 and 211 are kernel components while address 243 referenced by entry ID 213 is a user space component.

In an example, entry ID 212 may be initialized by a request to allocate a decoy virtual address 262 as an initial decoy associated with a decoy address 252A in memory device 114. In the example, decoy address 252A may be the same memory address as decoy addresses 252B-E. In an example, decoy addresses 252A-E for entry IDs 212 and 214-217 are not associated with any process that is currently executing. For example, entry IDs 214-217 are associated with unmapped virtual addresses 264-267, which are other potential locations where the components loaded to mapped virtual address 260, 261, 263 and therefore physical addresses 240, 241, and 243 may have been located (e.g., where ASLR calculations are executed with different inputs). In an example, a decoy virtual address 262 may be associated with the decoy address 252A, for example, if decoy address 252A is being implemented by a software component creating decoy address 252A. In some examples, multiple decoy addresses may be implemented, for example, to differentiate between an unused page table entry and a page table entry associated with data in memory designated for deletion. In an example, initializing entry ID 212 as a decoy page associated with decoy address 252A may cause decoy address 252A to be cached in a CPU cache, such as a TLB. In an example, a plurality of unused page table entry in page table 150 (e.g., entry IDs 214-217) may be initialized as a valid entry (e.g., validity 224-227) that is read, write, and/or execute protected (e.g., access rights 234A-237A) and associated with a decoy address (e.g., decoy addresses 252B-E). In an example, an attempt to access a page table entry associated with a decoy address (e.g., entry IDs 214-217) may cause an error in the application attempting such access (e.g., a page fault). In an example, such an application may be terminated as a result of the error. In an example, such an attempted access may be flagged and/or alerted to an administrator. In an example, address 240 is an initial physical memory location of a kernel component, assigned based on a physical memory allocation configuration of memory device 114, whose corresponding virtual address 260 may be randomly assigned based on an ASLR implementation in system 100.

Illustrated system 201 depicted in FIG. 2B may depict system 200 at a later point in time after an application launched at boot time associated with virtual address 261, entry ID 211 and address 241 exits. Virtual address 261 may then be deallocated (e.g., becoming unmapped virtual address 268) and its corresponding page table entry ID 211 updated to translate to decoy address 252F. In an example, decoy address 252F is the same decoy address as decoy addresses 252A-E. In an example updating entry ID 211 from address 241 to decoy address 252F effectively removes access to address 241 and enables data in address 241 to be overwritten. In an example, memory manager 140 may instruct the data in address 241 to be overwritten either before or after the reassignment of entry ID 211 to decoy address 252F. In an example, any further attempt to access entry ID 211 results in an error based on entry ID 211 being associated with decoy address 252F. In an example, reassigning entry ID 211 to decoy address 252F may also include an updating of access rights 231A, for example, to restrict all access. In an example, any data to be removed from memory may have its associated page table entries repointed to the decoy address. In an example, the contents in physical memory at the memory location of address 241 may not be immediately overwritten, but by updating page table entry 211 to point to decoy address 252F, attempting to access virtual address 261 after the application storing data at virtual address 261 deallocates the memory will return the decoy address's data rather than any remaining data that has not been overwritten at address 241.

Figure 3:
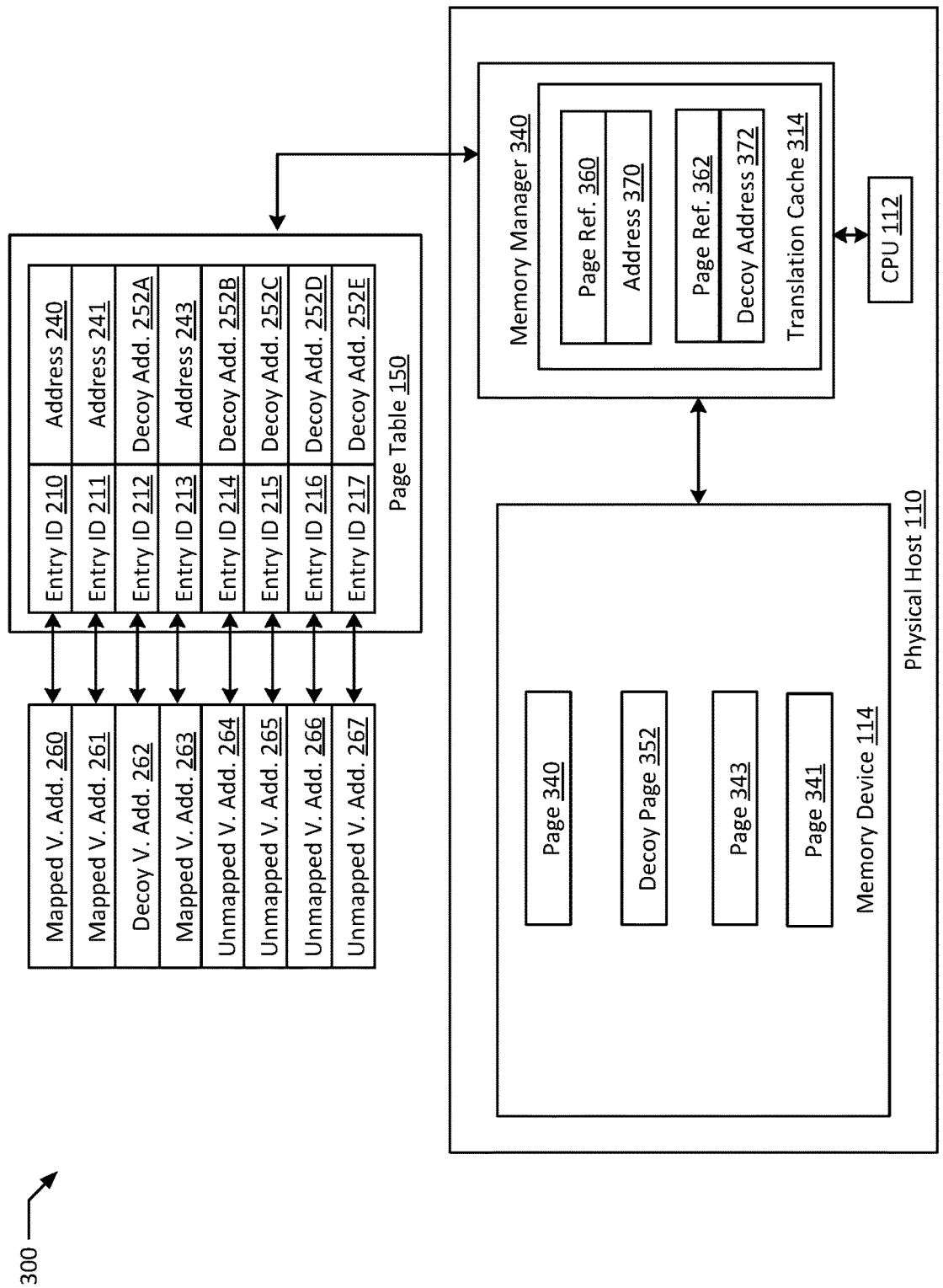
FIG. 3 is a block diagram illustrating memory address caching in an enhanced address space layout randomization system according to an example of the present disclosure.

FIG. 3 is a block diagram illustrating memory address caching in an enhanced address space layout randomization system according to an example of the present disclosure. In an example, system 300 illustrates system 100 with a translation cache 314 expanded. In an example, memory manager 340 is the same component as memory manager 140. In another example, memory manager 340 is a physical component providing some or all of the functionality of memory manager 140. In the example, memory manager 340 provides a translation interface between CPU 112 and memory device 114. In an example, memory manager 340 includes and/or is associated with translation cache 314. In an example, translation cache 314 is a TLB. In an example, initializing page table 150, for example, as illustrated in system 200, causes certain page table entries (e.g., entry IDs 210, 211, and 213) in page table 150 to become associated with addresses of certain memory pages in physical memory device 114. For example, address 240 points to page 340, address 241 points to page 341, and address 243 points to page 343. In the example, pages 340, 341, and 343 may be physically out of order in relation to entry IDs 210, 211, and 213. In an example, a decoy page table entry and/or currently unused page table entries (e.g., entry IDs 212, 214, and 215) are associated with decoy addresses 252A-C of decoy page 352 (e.g., based on being associated with unmapped virtual addresses 264-267). In an example, a page table entry (e.g., entry IDs 210-217) provides translation between a virtual memory address (e.g., mapped virtual addresses 260, 261, 263, unmapped virtual addresses 264-267, decoy virtual address 262) and a physical memory address (e.g., addresses 240, 241, 243, decoy address 252A-E). In the example, for CPU 112 to perform operations on the data stored in a particular memory page, that data needs to be loaded into physical memory (e.g., memory device 114). In an example, when data is loaded to physical memory, the data may be loaded into non-contiguous memory modules in memory device 114. For example, data may transition in and out of random access memory as needed, and therefore as data is swapped out of the random access memory, gaps between physical locations of in use memory locations form based on memory locations that have been reclaimed from previous use. Further use of the physical memory may then result in ever more fragmented physical memory locations for related data (e.g., of the same application). In an example, virtual references to the physical memory locations alleviate some of the costs of using non-contiguous physical storage blocks.

In an example, when access is requested for a page in memory device 114, for example, by requesting for one or more of mapped virtual addresses 260, 261, or 263, memory manager 340 may first determine if a location of the requested memory page (e.g., pages 340, 341, 343, or decoy page 352) is cached in translation cache 314. In the example, translation cache 314 may have a much smaller capacity than page table 150, and may therefore only cache a subset of the entries of page table 150. For example, translation cache 314 may cache frequently requested physical memory addresses (e.g., address 370 of page 340, decoy address 372 of decoy page 352) and/or references (e.g., page reference 360 of entry ID 210, or page reference 362 of entry ID 212). In another example, translation cache 314 may determine references and/or addresses to cache based on how recent a previous access attempt was made to the respective reference and/or address. In an example, page reference 360 and address 370 are cached versions of entry ID 210 and address 240. In the example, a request for entry ID 210 may be responded to by translation cache 314 with page 340 based on cached data. In an example, a request for any of entry IDs 212, 214, and 215 may be responded to be translation cache 314 with page reference 362 associated with decoy address 372, both associated with decoy page 352. In the example, decoy address 372 may remain consistently cached in translation cache 314 due to data deletions updating page table 150 for deleted page table entries to point to decoy page 352. In an example, a later attempt to access entry ID 211 evicts a page reference and address combination from translation cache 314. For example, page reference 360 and address 370 is replaced by a cached version of entry ID 211 and address 241 after attempted access to entry ID 211. In an example, address 241 points to page 341 in memory device 114.

Figure 4:
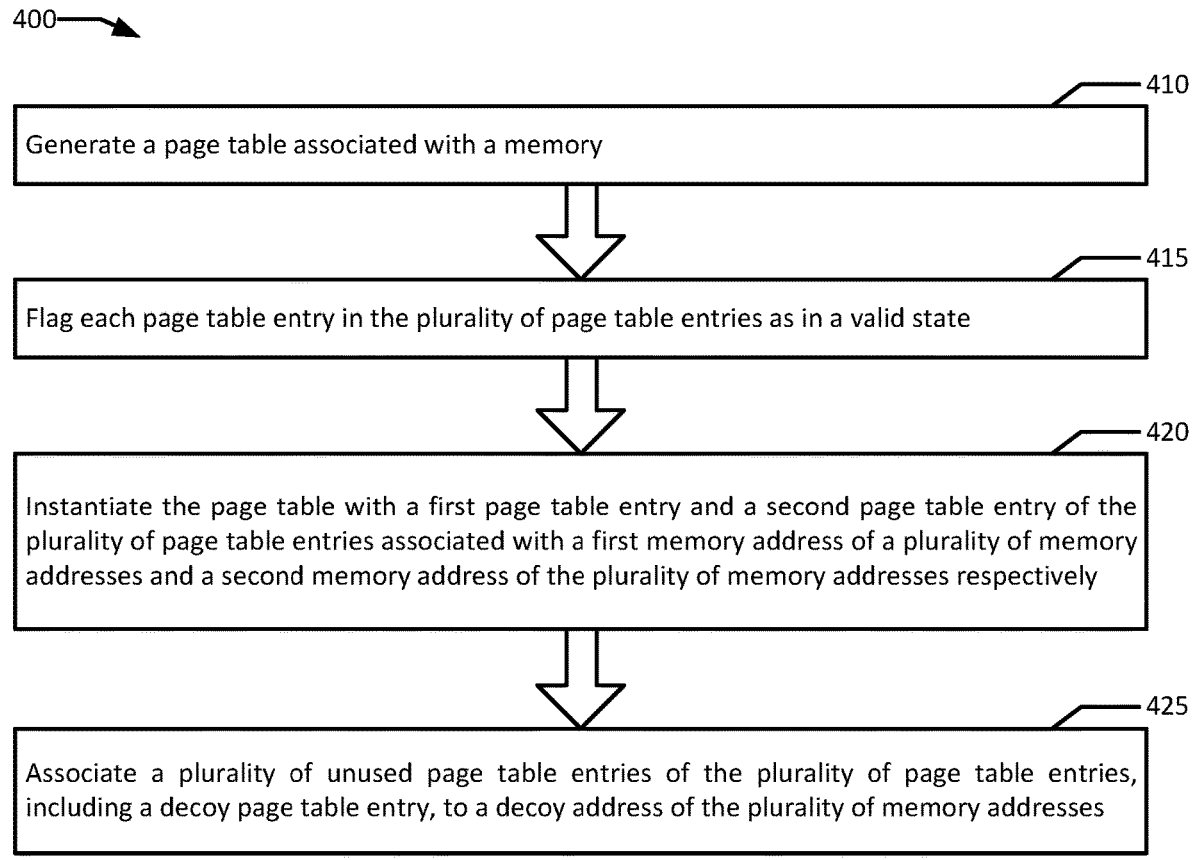
FIG. 4 is a flowchart illustrating an example of enhanced address space layout randomization according to an example of the present disclosure.

FIG. 4 is a flowchart illustrating an example of enhanced address space layout randomization according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a memory manager 140.

Example method 400 may begin with generating a page table associated with a memory (block 410). In an example, page table 150 may include virtual addresses (e.g., mapped virtual addresses 260, 261, 263, decoy virtual address 262, unmapped virtual addresses 264-267) associated with page table entries identified by entry IDs 210-217) associated with memory addresses in memory device 114. In various examples, multiple page tables may simultaneously include overlapping entries for the same physical memory address. For example, each virtual guest (e.g., VM 122, containers 172 and 174) may have separate page tables, and core components loaded to memory device 114 may have associated entries in each of the page tables associated with the different virtual guests. Different users and access accounts may also have different page tables. In some implementations, page tables may be nested and/or cross referenced to address a larger pool of memory than the capacity of a given page table. Each entry or page in a page table may typically address a block of memory of a given uniform size, representing the smallest discrete unit of memory that may be addressed in system 100. To illustrate page table capacity limits, in a 32-bit system, there is typically only enough entries to address roughly 3.5 gigabytes of memory in a page table. Therefore multiple and/or nested page tables may be implemented to address larger amounts of physical storage.

Each page table entry in the plurality of page table entries is flagged as in a valid state (block 415). In an example, page table 150 is initialized with each possible page table entry (e.g., page table entries referenced by entry IDs 210-217) flagged as valid entries based on validity flags in page table 150 (e.g., validity bits 220-227). In an example, when a valid page table entry is requested, regardless of whether a requestor has access to the data associated with the page table entry based on access rights flags (e.g., access rights 230A-232A, 233B, and 234A-237A), the memory address associated with the requested entry may be cached in a translation lookaside buffer (e.g., translation cache 314) associated with memory manager 140. In an example, a TLB (e.g., translation cache 314) stores recent translations of virtual memory addresses (e.g., mapped virtual addresses 260, 261, 263, decoy virtual address 262, unmapped virtual addresses 264-267, and page table entry IDs 210-217) to physical memory locations (e.g., pages 340, 341, 343, and decoy page 352). In the example, an unauthorized request may be rejected based on an access rights check of either the access rights flags in page table 150 or of cached access rights in translation cache 314.

The page table is instantiated with a first page table entry and a second page table entry of the plurality of page table entries associated with a first memory address of a plurality of memory addresses and a second memory address of the plurality of memory addresses respectively (block 420). In an example, a first virtual memory address (e.g., mapped virtual address 260) is randomly selected in the memory device 114. In an example, page table 150 includes a plurality of page table entries (e.g., page table entries identified by entry IDs 210-217). In an example, entry ID 210 associated with virtual address 260 translates to address 240 which is a location of page 340 in memory device 114 and entry ID 211 translates to address 241 which is a location of page 341 in memory device 114. In an example, virtual memory address 260 is randomly (or pseudo-randomly) selected (e.g., via ASLR) when page table 150 is instantiated, while address 240 is selected from available physical addresses in memory device 114 based configurations of memory device 114. In an example, addresses 240 and 241 are non-contiguous. In an example, mapped virtual addresses 260 and 261 are also non-continguous. In an example, an offset between the location of mapped virtual address 260 and mapped virtual address 261 may be determined based on configuration settings of physical host 110, host OS 118, hypervisor 120, VM 122, containers 172, 174, etc. In an example, the offset may include a randomization factor, which may be set for a given computing session at initialization time (e.g., boot-up, application loading, etc.). In an example, addresses 240 and 241 may store kernel space data, and access to addresses 240 and 241 may be controlled by access flags (e.g., access rights 230A-231A). In an example, access rights flag 233B may indicate that address 243 associated with page table entry ID 213 and page 243 that page table entry ID 213 is associated with user space data. In an example, a user space application may be restricted from directly accessing kernel space data (e.g., entry IDs 210 and 211).

In an example, upon reinitialization (e.g., restarting) of system 100, page table 150, hypervisor 120, host OS 118, or guest OS 196, a memory address of the data contents associated with one or more of entry IDs 210-213 may be moved to a different physical and/or virtual memory address. For example, address 240 may be an address of an initial page of memory used by host OS 118. In the example, each time host OS 118 is booted up, the same initial data may be stored in an initial page of memory in memory device 114. However, each time host OS 118 is booted up, the location of this initial data may be in a different virtual and/or physical address. For example, ASLR calculations may place the initial data in a different virtual address from mapped virtual address 260. In such an example, upon restart, the initial data may be allocated the virtual address that is currently unmapped virtual address 267, while the current mapped virtual address 260 may become an unmapped virtual address associated with the decoy address 252A-E, for example, based on being an unselected potential virtual address for the initial page. In an example, address 241 may be a second page of memory loaded upon host OS 118 being booted. In the example, address 241 may be located at a predefined offset distance from address 240. The predefined offset distance may include an offset factor, including one or more offset coefficients that may be periodically redefined, for example, upon restart of the system. In an example, the offset factors and/or coefficients may be randomized, but may be predictable based on a randomization factor in order for the computer system to be able to determine the memory locations of data in a predictable manner. For example, a randomization factor may be based on a reading from a CPU clock of CPU 112 at a given point in its initialization sequence.

A plurality of unused page table entries of the plurality of page table entries, including a decoy page table entry, are associated to a decoy address of the plurality of memory addresses (block 425). In an example, upon initialization a decoy page 352 is generated in memory device 114 upon initialization, and decoy page 352 is referenced by all of the unused entries in page table 150 (e.g., entry IDs 214-217). In an example, decoy page 352 may be initialized by mapping an initial decoy entry (e.g., decoy entry ID 212) to decoy page 352 (e.g., via decoy address 252A) during the initialization of page table 150. In an example, each page table entry referencing decoy page 352 is flagged as requiring elevated access (e.g., access rights 232A, 234A-237A). For example, access to and/or modification of decoy page 352 and/or decoy address references 252A-252E may require elevated access. In an example, access to the decoy address (e.g., decoy addresses 252A-252E) is protected from read access, write access, execute access, and/or unprivileged access (e.g., from user space). In an example, decoy page 352 in memory device 114 may be further protected from modification with configurations on memory device 114. In an example, attempted unauthorized access to decoy addresses 252A-E may trigger an error such as a page fault. In an example, the error may cause an application attempting such access to crash. In the example, such crashes may cause brute force attempts at locating exploitable memory pages to take too long to reasonably succeed before being detected. In an example, attempting to access decoy addresses 252A-E may further cause an application and/or account to be flagged as a potential security risk. In such examples, one or more such access attempts may cause the application and/or account to be locked from further system access. In an example, such flagged applications and accounts may be reported to system administrators.

In an example, the relationship between entry ID 210, address 240, and page 340 may be cached in translation cache 314, for example, as page references 360 and address 370. In an example, the relationship between entry IDs 212, 214, and 215, decoy addresses 252A-C, and decoy page 352 may also be cached in translation cache 314, for example, as page references 362 and decoy address 372. In an example, where a page entry reference to memory address combination is cached in translation cache 314, memory manager 340 may preferentially retrieve the reference from translation cache 314 instead of querying page table 150. In an example, a lookup in translation cache 314 may be significantly faster than a lookup from page table 150, for example, due to the translation cache 314 being physically closer to CPU 112 and the translation cache 314 being smaller than page table 150. In an example, page table 150 may be implemented in one or more memory pages on memory device 114, and a location of page table 150 may be permanently cached in translation cache 314. In an example, page table 150 may be the initial page instantiated in on memory device 114. In an example, since decoy address 372 is a valid page table entry pointing to decoy page 352, attempting to access entry IDs 212 and/or 213-217 may return a result (e.g., an error or access rights based rejection) in a similar cache return time frame to attempting to access an in-use memory page (e.g., entry IDs 210, 211, 213) pointing to a memory address (e.g., addresses 240, 241, 243) with data for processing (e.g., pages 340, 341, 343). In an example, if decoy address 372 ever becomes uncached, for example, due to no attempted access for a given timeout period, it would become cached after the next attempted access, behaving similarly to any other memory page that fell out of cache. The initial cache miss would therefore generate no useful information regarding whether any of the decoy page table entries are valid, in-use entries.

In an example, if a previously in-use memory page becomes disused and requires deletion, rather than setting the entry to an invalid state, the address reference associated with the entry may be updated to point to the decoy address (e.g., decoy page 352) thereby effectively invalidating the page table entry. Similarly, a new memory address may be written to and a page table entry may be repointed to the new memory address for a modification to be made to the data referenced by the page table entry. In some circumstances, an entry ID in a page table may be set to invalid temporarily. For example, if page table 150 fails to have enough entries to address all of the memory blocks in memory device 114 (e.g., a 32 bit system), a given page table entry may actually be a reference to a secondary page table addressing additional space. In such a situation, where a page table entry needs to be deleted, the entry in page table 150 (e.g., entry ID 211) may be temporarily set to invalid while the associated entry in the associated secondary page table is repointed to the decoy page 352, and then entry ID 211 may be set to valid once again. In an example, entry ID 211 may also be repointed to decoy page 352.

Figure 5:
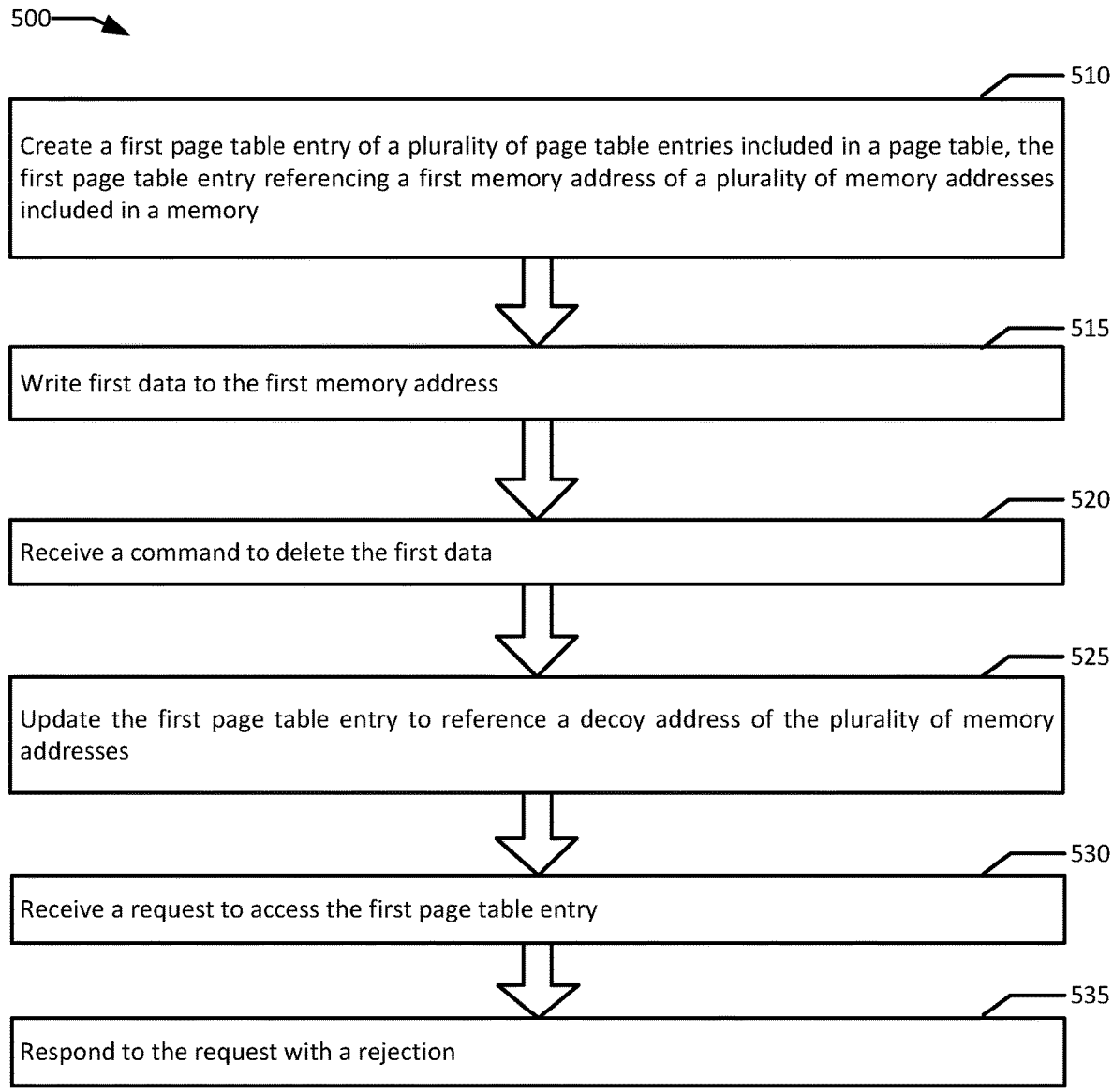
FIG. 5 is a flowchart illustrating an example of accessing memory in an enhanced address space layout randomization system according to an example of the present disclosure.

In an example, FIG. 5 is a flowchart illustrating an example of accessing memory in an enhanced address space layout randomization system according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by a memory manager 140.

Example method 500 may begin with creating a first page table entry of a plurality of page table entries included in a page table, the first page table entry referencing a first memory address of a plurality of memory addresses included in a memory (block 510). In an example, page table entry IDs 210 and 211 may reference kernel space data (e.g., pages 340 and 341 via addresses 240 and 241). In an example, page table entry ID 213 may reference user space data (e.g., page 343 via address 243). In an example, attempting to access entry ID 210 from a user space (e.g., a user space of host OS 118, guest OS 196, and or containers 172 and 174) may generate an error. In an example, each page table entry (e.g., entry IDs 210-217) is associated to either a data address (e.g., addresses 240, 241, 243 of data pages 340, 341, 343) or the decoy address and data (e.g., decoy page 352).

First data is written to the first memory address (block 515). In an example, data is written to page 341 associated with address 241. For example, an application requests mapped virtual address 261 to be allocated for application data. In an example, mapped virtual address 261 associated with address 241 is selected randomly and then associated with page table entry ID 211, which is in turn assigned address 241 as a physical location reference (e.g., to page 341) in memory device 114. In an example, addresses 240 and 243 are physically non-contiguous with address 241, and virtual addresses 260 and 263 are virtually non-contiguous with virtual address 261. In an example, if the first data is too large for page 341, a second page may be allocated for the data and associated with an additional page table entry. In an example, one component (e.g., one shared library or executable) may be stored in multiple memory blocks and pages. In the example, the singular component may be divided over multiple non-continuous memory addresses for additional security. In an example, a decoy address (e.g., decoy addresses 252A-E) may be assigned to unused page table entries of page table 150 (e.g., entry IDs 212, 214-217). For example, entry IDs 214-217 may be associated with alternative possible virtual addresses for the data associated with mapped virtual address 261, and instead of ignoring these alternative potential entry IDs (e.g., leaving them undefined and invalid), entry IDs 214-217 are set to valid (e.g., validity 224-227) and pointed to decoy address 252B-E. In the example, the decoy address 252A-E points to a physical decoy page 352. In the example, any translation cache (e.g., translation cache 314) associated with memory manager 340 may cache virtual memory page references to both in-use physical data addresses (e.g., to pages 340, 341, 343), as well as the decoy address (e.g., to decoy page 352). In the example, caching references to decoy page 352 results in obfuscating any timing differences between attempting to access an in-use data address without sufficient rights and attempting to access decoy addresses 252B-E.

A command is received to delete the first data (block 520). For example, an application requesting the first data may have completed its memory operations on the first data and the data may no longer be needed. In the example, the application requests to deallocate mapped virtual address 261. In another example, an application may terminate and its memory space may be reclaimed. In an example, upon receiving the command, memory manager 140 and/or 340 updates entry ID 211 associated with address 241 of page 341 to translate to decoy page 351 (block 525). A request is received to access the first page table entry (block 530). In an example, further attempts to access now unmapped virtual address 268 (e.g., the deallocated mapped virtual address 261) or entry ID 211 will result in an error based on attempting to access decoy page 352. An error may be generated due to access credentials (e.g., access rights 230A) limiting rights to read, write, and/or execute decoy page 352 and/or a decoy address entry in page table 150. The request is responded to with a rejection (block 535). In an example, the attempt to access entry ID 211, now repointed to reference decoy page 352, is met with an error. In an example, such access attempts are recorded and/or reported to administrators. In an example, such access attempts may result in suspension and/or eviction of access privileges to system 100.

Figure 6:
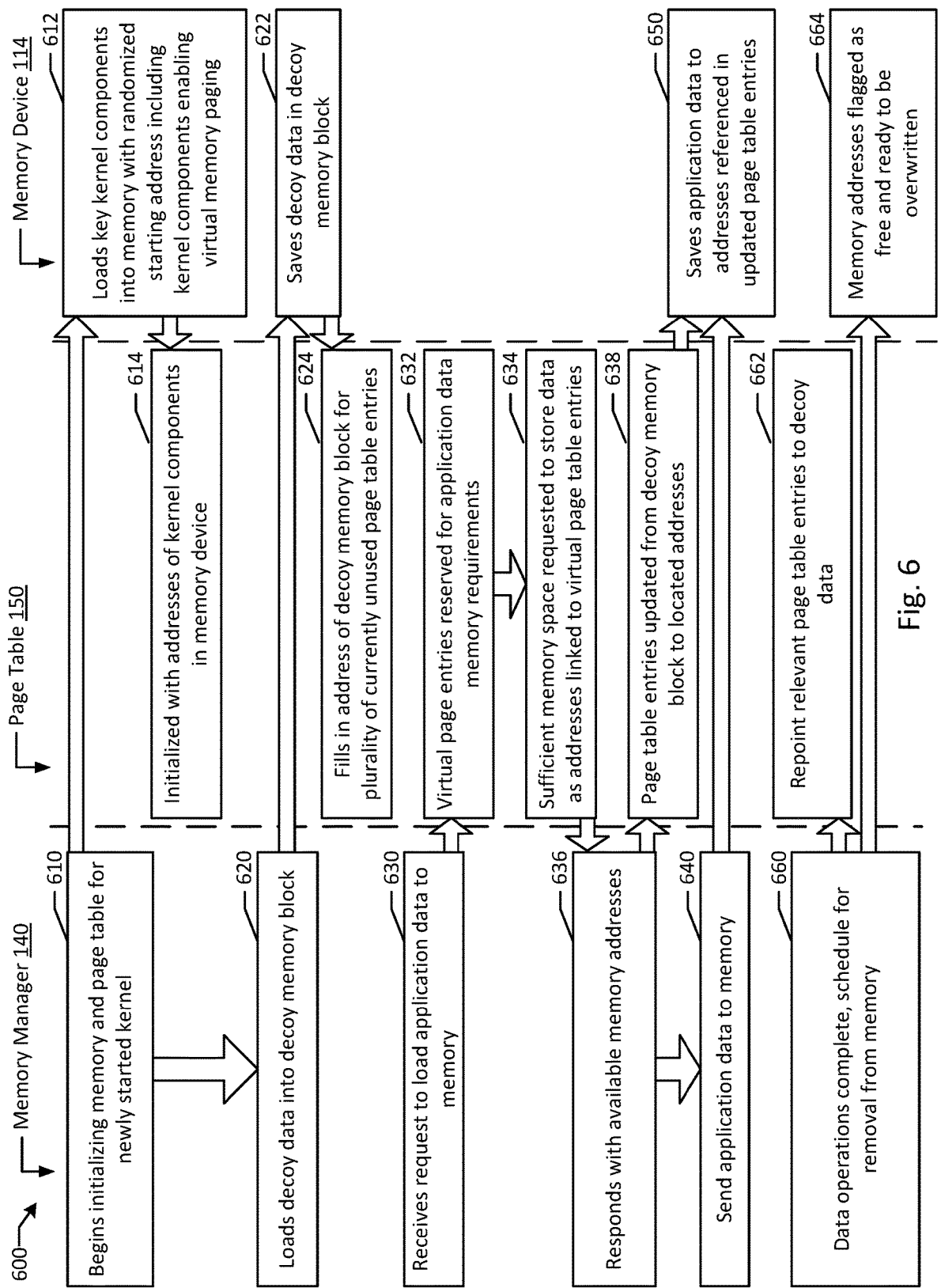
FIG. 6 is flow diagram of an example of enhanced address space layout randomization according to an example of the present disclosure.

FIG. 6 is flow diagram of an example of enhanced address space layout randomization according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, memory manager 140, page table 150, and memory device 114 execute enhanced address space layout randomization.

In example system 600, memory manager 140 begins initializing memory device 114 and page table 150 for a newly started kernel (e.g., host OS 118, guest OS 196) (block 610). In an example, memory device 114 loads key kernel components into memory with a randomized starting virtual memory address (e.g., mapped virtual address 260 associated with address 240 of page 340), such key kernel components (e.g., pages 340 and 341) including those that enable virtual memory paging (e.g., page table 150) (block 612). In an example, an initialization sequence requests the allocation of mapped virtual addresses 260 and 261 for the kernel. In an example, page table 150 is initialized with the memory addresses of the kernel components as they are loaded into memory device 114 (block 614). In an example, memory manager 140 instructs decoy data to be loaded into a decoy memory block (e.g., decoy page 352) in memory device 114 (block 620). For example, alternative potential virtual addresses for mapped virtual addresses 260 and/or 261 (e.g., unmapped virtual addresses 264-267) may be associated with decoy address 252A-E. In another example, a decoy virtual address 262 is explicitly allocated and assigned to entry ID 212 in page table 150, associated with decoy address 252A, and other alternative unselected virtual addresses for decoy virtual address 262 (e.g., unmapped virtual addresses 264-267) may also be associated with decoy address 252B-E. In an example, memory device 114 saves the decoy data to the decoy memory block (e.g., decoy page 352) (block 622). In an example, page table 150 may then flag additional possible page table entries as valid and point those unused page table entries (e.g., entry IDs 214-217) to translate to decoy page 352 (block 624). In an alternative example, even if only a portion of the unused page table entries in page table 150 are referenced to decoy page 352, significant security advantages may be realized. For example, as long as sufficient decoy page table entries are introduced to provide a high likelihood of false positive readings to an attacker attempting a side-channel attack such as a cache timing attack, the attack may be defeated before sufficient memory addresses are discovered to calculate where critical memory addresses may be located. Therefore a balance may be struck between memory overhead committed to page table entries for decoy addresses and security concerns.

In an example, memory manager 140 then receives a request to load application data to memory (block 630). For example, a memory allocation request (e.g., malloc) is received for the allocation of virtual memory (e.g., mapped virtual addresses 260, 261, 263). In various examples, application data may be data of an application executed by the kernel (e.g., of host OS 118 or guest OS 196) or an application in a user space on top of the kernel (e.g., containers 172 and 174 or applications 177 and 178 executing on top of guest OS 196). In an example, virtual page entries are reserved for the application data based on memory requirements (block 632). In an example, sufficient physical memory addresses are requested to store the data addressed by the allocated virtual page table entries (block 634). In some examples, data may need to be evicted from physical memory (e.g., into persistent storage) to make room for the application data. In an example, memory manager 140 may respond to page table 150 with available memory addresses in memory device 114 for saving the application data (block 636). In the example, page table 150 is updated to repoint a plurality of page table entries associated with the application data from the address of decoy page 352 (e.g., decoy addresses 252A-E) to the addresses received from memory manager 140 (block 638). In an example, memory manager 140 directs the application data to be saved in the selected memory addresses (block 640). In the example, memory device 114 saves the application data in the selected memory addresses that are referenced by the updated page table entries in page table 150 (block 650).

In an example, memory manager 140 receives notice that the application data operations are complete and the application data may be removed from memory (block 660). In the example, page table 150 is updated to repoint the application data page entries to the decoy page 352 (block 662). In the example, memory device 114 the physical memory addresses used by the application data are flagged as free and ready to be overwritten by new data (block 664). In various examples, the previously used addresses may be lazily overwritten when processing and memory access requirements in system 100 are low. In some high security implementations, deletion of data in physical memory, such as those of the application data, may be made permanent by immediately overwriting the data in the memory locations of the deallocated memory addresses, for example, with all zeros, all ones, or some random string of zeros and ones.

Figure 7:
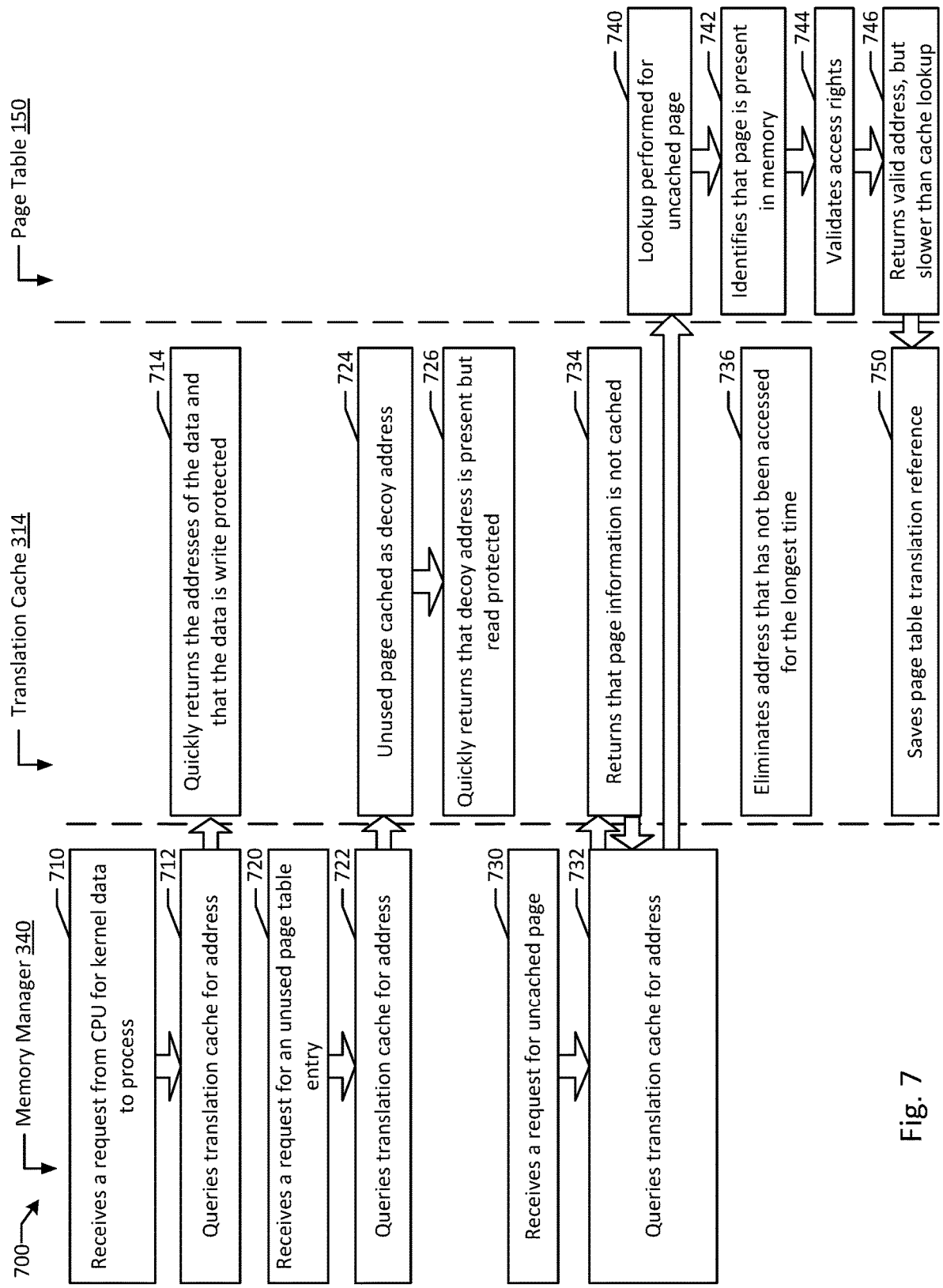
FIG. 7 is flow diagram of an example of cached memory access in an enhanced address space layout randomization system according to an example of the present disclosure.

FIG. 7 is flow diagram of an example of cached memory access in an enhanced address space layout randomization system according to an example of the present disclosure. Although the examples below are described with reference to the flowchart illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700, memory manager 340, translation cache 314, and page table 150 execute enhanced address space layout randomization.

In example system 700, memory manager 340 receives a request from CPU 112 for kernel data to process (block 710). In the example, memory manager 340 queries translation cache 314 for the memory addresses of the requested kernel data (block 712). In the example, translation cache 314 quickly responds that the kernel data is present in memory, sending the addresses of the data to memory manager 340 and CPU 112, as well as notifying memory manager 340 that the data is write protected (block 714). For example, a query resulting in a cache hit in translation cache 314 may result in a response and lookup typically at least 20-30% faster than a page table lookup, and in some instances a cache hit may be 2-10 times faster than a page table lookup.

In an example, memory manager 340 then receives a request to access an unused page table entry (e.g., entry ID 214) (block 720). In the example, memory manager 340 queries translation cache 314 for a memory address of entry ID 214 (block 722). In the example, translation cache 314 has the unused page (e.g., entry ID 214) cached as referencing the decoy address of decoy page 352 (block 724). In the example, translation cache 314 once again quickly returns that the decoy address is present but that access is denied because decoy entry ID 214 (and other entry IDs that translate to decoy page 352) are read protected (block 726). In an example, the application requesting the unused page may receive an error.

In an example, memory manager 340 receives a request for an uncached page (block 730). In the example, memory manager 340 queries translation cache 314 for the uncached page (block 732). In the example, translation cache 314 responds with a cache miss indicating that the page translation information is not in translation cache 314 (block 734). In an example, memory manager 340 may initiate a query of page table 150 based on the cache miss from translation cache 314. In another example, memory manager 340 may substantially simultaneously initiate queries with both translation cache 314 and page table 150, allowing either translation cache 314 or page table 150 to respond with translation results. In such an example, translation cache 314 may not respond at all to memory manager 340 in the event of a cache miss. In an example, translation cache 314 anticipates that a translation information of a new page will be cached based on the cache miss and eliminates the address translation information currently in translation 314 that has gone the longest time without being accessed (block 736). In various examples, translation cache 314 may employ different factors for determining which cached translation entries are eliminated to make room for new entries, for example, longest tenured or first in first out etc.

In an example, page table 150 looks up the uncached page (block 740). In the example, page table 150 identifies that the page is present in memory device 114 (block 742). In the example, page table 150 validates the access rights to the memory page based on a requestor of the uncached page (block 744). In the example, page table 150 returns the address of the uncached page but the lookup is slower than the successful cache lookups of the kernel data and the decoy data (block 746). In the example, translation cache 314 saves the translation reference found in the page table lookup performed by page table 150 (block 750). In an example, a subsequent query for the same page is responded to by translation cache 314.

Figure 8:
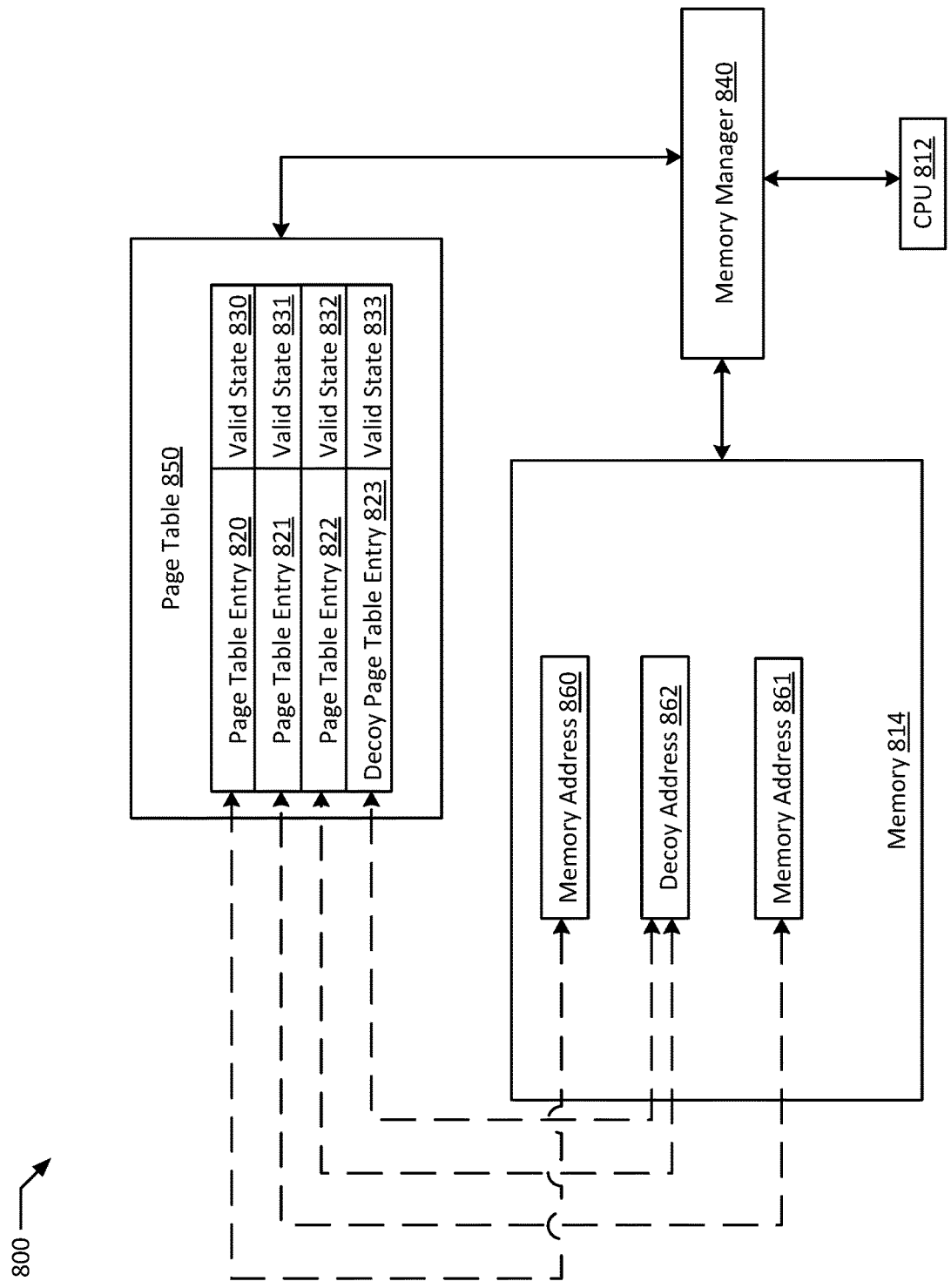
FIG. 8 is a block diagram of an example enhanced address space layout randomization system according to an example of the present disclosure.

FIG. 8 is a block diagram of an example enhanced address space layout randomization system according to an example of the present disclosure. Example system 800 includes memory 814, which includes memory addresses 860, 861, and decoy address 862 (which is also a "valid" memory address in memory 814), and memory manager 840 that executes on CPU 812. A page table 850 is generated associated with memory 814, where page table 850 includes page table entries 820-822 and decoy page table entry 823. Each of page table entries 820-822 as well as decoy page table entry 823 is flagged as being in a valid state (e.g., valid states 830-833). Page table 850 is instantiated with page table entry 820 associated with memory address 860 and page table entry 821 associated with memory address 861, where the respective relationships between page table entry and memory address are illustrated with dotted lines in FIG. 8. Unused page table entry 822 and decoy page table entry 823 are associated with decoy address 862.

Figure 9:
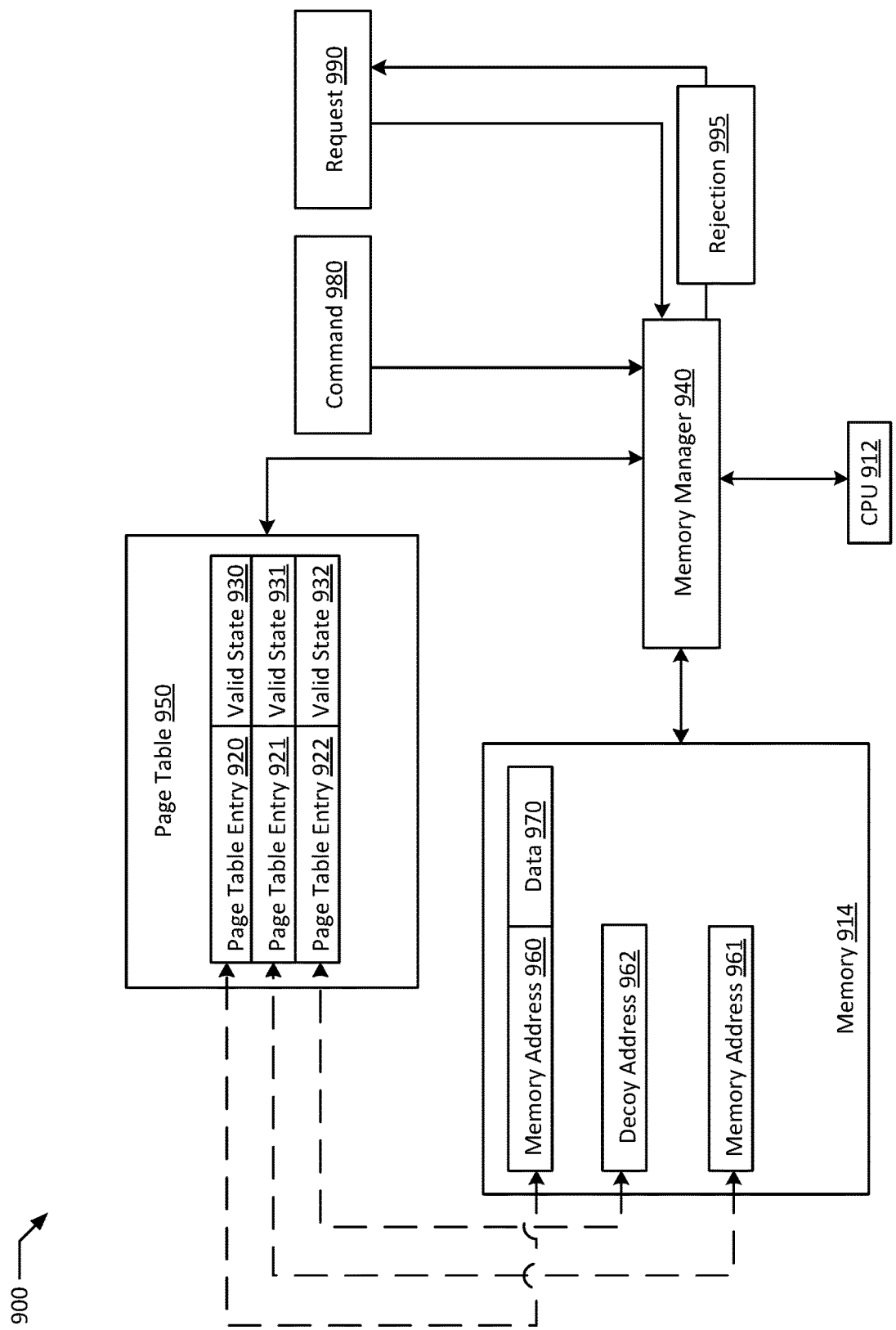
FIG. 9 is a block diagram of an accessing memory in an example enhanced address space layout randomization system according to an example of the present disclosure.

FIG. 9 is a block diagram of an accessing memory in an example enhanced address space layout randomization system according to an example of the present disclosure. Example system 900 includes memory 914, which includes memory addresses 960 and 961 as well as decoy address 962 (which is a "valid" memory address in memory 914). Page table 950 includes page table entries 920-922, each of which is flagged in a valid state (e.g., valid states 930-932) and each associated with one of memory addresses 960 and 961 or decoy address 962, the respective relationships between page table entry and memory address are illustrated with dotted lines in FIG. 9. Memory manager 940 executes on CPU 912 to create page table entry 920 referencing memory address 960. Data 970 is written to memory address 960. Command 980 is received to delete data 970. Page table entry 920 is updated to translate to decoy address 962 (e.g., instead of memory address 960). Request 990 is received to access page table entry 920. Request 990 is responded to with rejection 995.

Enhanced address space layout randomization as disclosed by the present specification enables obfuscating the access timing differences between in-use page table entries and unused page table entries without requiring translation caches to be flushed upon context switches by allowing unused page table entries to behave as if they are valid, in-use page table entries. Therefore security threats based on exploiting cache timing differences to leak kernel space memory addresses may be defended against without incurring extra performance penalties during context switches. In heavily virtualized environments where numerous user spaces may all require access to certain shared kernel components, this may result in 20-30% reduced processor cycles in seek time to locate these commonly used components in memory, resulting in significant performance advantages over alternative mitigations that require flushing kernel references from translation caches upon context switches.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a memory including a first memory address and a second memory address of a plurality of memory addresses, wherein at least one of the plurality of memory addresses is a decoy address; and a memory manager on one or more processors executing to: generate a page table associated with the memory, wherein the page table includes a plurality of page table entries; flag each page table entry in the plurality of page table entries as in a valid state; instantiate the page table with a first page table entry and a second page table entry of the plurality of page table entries associated with the first memory address and the second memory address respectively, wherein a first virtual memory address is randomly selected and the first virtual memory address is associated with the first page table entry and with the first memory address, wherein the plurality of page table entries is generated based on a request to allocate the virtual memory address; and associate a plurality of unused page table entries of the plurality of page table entries, including a decoy page table entry, to the decoy address.

In accordance with a 2nd exemplary aspect of the present disclosure, which may be used in combination with any one or more of other aspects described herein (e.g., the 1st aspect), wherein the second page table entry references kernel space data, and the first memory address is non-contiguous with the second memory address. In accordance with a 3rd exemplary aspect of the present disclosure, which may be used in combination with any one or more of other aspects described herein (e.g., the 2nd aspect), wherein the second page table entry is later associated to a different third memory address. In accordance with a 4th exemplary aspect of the present disclosure, which may be used in combination with any one or more of other aspects described herein (e.g., the 2nd aspect), wherein the second page entry is later associated to the decoy address. In accordance with a 5th exemplary aspect of the present disclosure, which may be used in combination with any one or more of other aspects described herein (e.g., the 2nd aspect), wherein a third page table entry of the plurality of page table entries references user space data.

In accordance with a 6th exemplary aspect of the present disclosure, which may be used in combination with any one or more of other aspects described herein (e.g., the 1st aspect), wherein upon reinitialization of the page table, the first page table entry is associated with a different second virtual memory address. In accordance with a 7th exemplary aspect of the present disclosure, which may be used in combination with any one or more of other aspects described herein (e.g., the 1st aspect), wherein accessing an unused page table entry referencing the decoy address triggers an error. In accordance with a 8th exemplary aspect of the present disclosure, which may be used in combination with any one or more of other aspects described herein (e.g., the 1st aspect), wherein access to the decoy address is protected from at least one of read access, write access, execute access, and unprivileged access. In accordance with a 9th exemplary aspect of the present disclosure, which may be used in combination with any one or more of other aspects described herein (e.g., the 1st aspect), wherein both the first memory address and the decoy address are cached in a translation cache. In accordance with a 10th exemplary aspect of the present disclosure, which may be used in combination with any one or more of other aspects described herein (e.g., the 9th aspect), wherein a first time elapsed accessing the first page table entry and a second time elapsed accessing an unused page table entry are both within a cache return time frame.

Aspects of the subject matter described herein may be useful alone or in combination with one or more other aspects described herein. In a 11th exemplary aspect of the present disclosure, a method comprises generating a page table associated with a memory, wherein the page table includes a plurality of page table entries; flagging each page table entry in the plurality of page table entries as in a valid state; instantiating the page table with a first page table entry and a second page table entry of the plurality of page table entries associated with a first memory address of a plurality of memory addresses and a second memory address of the plurality of memory addresses respectively, wherein a virtual memory address is randomly selected and the virtual memory address is associated with the first page table entry and with the first memory address, wherein the plurality of page table entries is generated based on a request to allocate the virtual memory address; and associating a plurality of unused page table entries of the plurality of page table entries, including a decoy page table entry, to a decoy address of the plurality of memory addresses.

Aspects of the subject matter described herein may be useful alone or in combination with one or more other aspects described herein. In a 12th exemplary aspect of the present disclosure, a system comprises a means for generating a page table associated with a memory, wherein the page table includes a plurality of page table entries; a means for flagging each page table entry in the plurality of page table entries as in a valid state; a means for instantiating the page table with a first page table entry and a second page table entry of the plurality of page table entries associated with a first memory address of a plurality of memory addresses and a second memory address of the plurality of memory addresses respectively, wherein a virtual memory address is randomly selected and the virtual memory address is associated with the first page table entry and with the first memory address, wherein the plurality of page table entries is generated based on a request to allocate the virtual memory address; and a means for associating a plurality of unused page table entries of the plurality of page table entries, including a decoy page table entry, to a decoy address of the plurality of memory addresses.

Aspects of the subject matter described herein may be useful alone or in combination with one or more other aspects described herein. In a 13th exemplary aspect of the present disclosure, a computer-readable non-transitory storage medium storing executable instructions, which when executed by a computer system, cause the computer system to: generate a page table associated with a memory, wherein the page table includes a plurality of page table entries; flag each page table entry in the plurality of page table entries as in a valid state; instantiate the page table with a first page table entry and a second page table entry of the plurality of page table entries associated with a first memory address of a plurality of memory addresses and a second memory address of the plurality of memory addresses respectively, wherein a first virtual memory address is randomly selected and the first virtual memory address is associated with the first page table entry and with the first memory address, wherein the plurality of page table entries is generated based on a request to allocate the virtual memory address; and associate a plurality of unused page table entries of the plurality of page table entries, including a decoy page table entry, to a decoy address of the plurality of memory addresses.

In accordance with a 14th exemplary aspect of the present disclosure, which may be used in combination with any one or more of other aspects described herein (e.g., the 11th, 12th, or 13th aspects), wherein the second page table entry references kernel space data, and the first memory address is non-contiguous with the second memory address. In accordance with a 15th exemplary aspect of the present disclosure, which may be used in combination with any one or more of other aspects described herein (e.g., the 14th aspect), further comprises associating the second page table entry to a different third memory address. In accordance with a 16th exemplary aspect of the present disclosure, which may be used in combination with any one or more of other aspects described herein (e.g., the 14th aspect), further comprises associating the second page entry to the decoy address. In accordance with a 17th exemplary aspect of the present disclosure, which may be used in combination with any one or more of other aspects described herein (e.g., the 14th aspect), wherein a third page table entry of the plurality of page table entries references user space data.

In accordance with an 18th exemplary aspect of the present disclosure, which may be used in combination with any one or more of other aspects described herein (e.g., the 11th, 12th, or 13th aspects), further comprises reinitializing the page table; and associating the first page table entry with a different second virtual memory address. In accordance with a 19th exemplary aspect of the present disclosure, which may be used in combination with any one or more of other aspects described herein (e.g., the 11th, 12th, or 13th aspects), further comprises triggering an error based on accessing one of an unused page table entry and the decoy page table entry. In accordance with a 20th exemplary aspect of the present disclosure, which may be used in combination with any one or more of other aspects described herein (e.g., the 11th, 12th, or 13th aspects), wherein access to the decoy address is protected from at least one of read access, write access, execute access, and unprivileged access. In accordance with a 21st exemplary aspect of the present disclosure, which may be used in combination with any one or more of other aspects described herein (e.g., the 11th, 12th, or 13th aspects), wherein both the first memory address and the decoy address are cached in a translation cache. In accordance with a 22nd exemplary aspect of the present disclosure, which may be used in combination with any one or more of other aspects described herein (e.g., the 21st aspect), wherein a first time elapsed accessing the first page table entry and a second time elapsed accessing an unused page table entry are both within a cache return time frame.

Aspects of the subject matter described herein may be useful alone or in combination with one or more other aspects described herein. In a 23rd exemplary aspect of the present disclosure, a system comprises a memory including a plurality of memory addresses; a page table including a plurality of page table entries, wherein each page table entry in the page table is flagged as valid and each page table entry is associated with a memory address of the plurality of memory addresses; a memory manager on one or more processors executing to: create a first page table entry of the plurality of page table entries referencing a first memory address of the plurality of memory addresses; write first data to the first memory address; receive a command to delete the first data; update the first page table entry to reference a decoy address of the plurality of memory addresses; receive a request to access the first page table entry; and respond to the request with a rejection.

In accordance with a 24th exemplary aspect of the present disclosure, which may be used in combination with any one or more of other aspects described herein (e.g., the 23rd aspect), wherein the first page table entry references kernel space data. In accordance with a 25th exemplary aspect of the present disclosure, which may be used in combination with any one or more of other aspects described herein (e.g., the 24th aspect), wherein a second page table entry of the plurality of page table entries references user space data. In accordance with a 26th exemplary aspect of the present disclosure, which may be used in combination with any one or more of other aspects described herein (e.g., the 25th aspect), wherein accessing the first page table entry from a user space generates an error.

In accordance with a 27th exemplary aspect of the present disclosure, which may be used in combination with any one or more of other aspects described herein (e.g., the 23rd aspect), wherein each page table entry of the plurality of page table entries is associated with one of a data address and a decoy address. In accordance with a 28th exemplary aspect of the present disclosure, which may be used in combination with any one or more of other aspects described herein (e.g., the 23rd aspect), wherein a first virtual memory address is randomly selected and the first virtual memory address is associated with the first page table entry and with the first memory address and a second virtual memory address associated with a second page table entry of the plurality of page table entries is non-contiguous with the first virtual memory address. In accordance with a 29th exemplary aspect of the present disclosure, which may be used in combination with any one or more of other aspects described herein (e.g., the 23rd aspect), wherein accessing an unused page table entry referencing the decoy address triggers an error. In accordance with a 30th exemplary aspect of the present disclosure, which may be used in combination with any one or more of other aspects described herein (e.g., the 23rd aspect), wherein access to the decoy address is protected by access credentials controlling at least one of read access, write access, execute access, and unprivileged access. In accordance with a 31st exemplary aspect of the present disclosure, which may be used in combination with any one or more of other aspects described herein (e.g., the 23rd aspect), wherein both the first memory address and the decoy address are cached in a translation cache. In accordance with a 32nd exemplary aspect of the present disclosure, which may be used in combination with any one or more of other aspects described herein (e.g., the 31st aspect), wherein a first time elapsed accessing the first page table entry and a second time elapsed accessing an unused page table entry are both within a cache return time frame.

Aspects of the subject matter described herein may be useful alone or in combination with one or more other aspects described herein. In a 33rd exemplary aspect of the present disclosure, a method comprises creating a first page table entry of a plurality of page table entries included in a page table, the first page table entry referencing a first memory address of a plurality of memory addresses included in a memory; writing first data to the first memory address; receiving a command to delete the first data; updating the first page table entry to reference a decoy address of the plurality of memory addresses; receiving a request to access the first page table entry; and responding to the request with a rejection.

Aspects of the subject matter described herein may be useful alone or in combination with one or more other aspects described herein. In a 34th exemplary aspect of the present disclosure, a system comprises a means for creating a first page table entry of a plurality of page table entries included in a page table, the first page table entry referencing a first memory address of a plurality of memory addresses included in a memory; a means for writing first data to the first memory address; a means for receiving a command to delete the first data; a means for updating the first page table entry to reference a decoy address of the plurality of memory addresses; a means for receiving a request to access the first page table entry; and a means for responding to the request with a rejection.

Aspects of the subject matter described herein may be useful alone or in combination with one or more other aspects described herein. In a 35th exemplary aspect of the present disclosure, a computer-readable non-transitory storage medium storing executable instructions, which when executed by a computer system, cause the computer system to: create a first page table entry of a plurality of page table entries included in a page table, the first page table entry referencing a first memory address of a plurality of memory addresses included in a memory; write first data to the first memory address; receive a command to delete the first data; update the first page table entry to reference a decoy address of the plurality of memory addresses; receive a request to access the first page table entry; and respond to the request with a rejection.

In accordance with a 36th exemplary aspect of the present disclosure, which may be used in combination with any one or more of other aspects described herein (e.g., the 33rd, 34th, or 35th aspects), wherein the first page table entry references kernel space data. In accordance with a 37th exemplary aspect of the present disclosure, which may be used in combination with any one or more of other aspects described herein (e.g., the 36th aspect), wherein a second page table entry of the plurality of page table entries references user space data. In accordance with a 38th exemplary aspect of the present disclosure, which may be used in combination with any one or more of other aspects described herein (e.g., the 37th aspect), wherein accessing the first page table entry from a user space generates an error.

In accordance with a 39th exemplary aspect of the present disclosure, which may be used in combination with any one or more of other aspects described herein (e.g., the 33rd, 34th, or 35th aspects), wherein each page table entry of the plurality of page table entries is associated with one of a data address and a decoy address. In accordance with a 40th exemplary aspect of the present disclosure, which may be used in combination with any one or more of other aspects described herein (e.g., the 33rd, 34th, or 35th aspects), wherein a first virtual memory address is randomly selected and the first virtual memory address is associated with the first page table entry and with the first memory address and a virtual second memory address associated with a second page table entry of the plurality of page table entries is non-contiguous with the first virtual memory address. In accordance with a 41st exemplary aspect of the present disclosure, which may be used in combination with any one or more of other aspects described herein (e.g., the 33rd, 34th, or 35th aspects), wherein accessing an unused page table entry referencing the decoy address triggers an error. In accordance with a 42nd exemplary aspect of the present disclosure, which may be used in combination with any one or more of other aspects described herein (e.g., the 33rd, 34th, or 35th aspects), wherein access to the decoy address is protected by access credentials controlling at least one of read access, write access, execute access, and unprivileged access. In accordance with a 43rd exemplary aspect of the present disclosure, which may be used in combination with any one or more of other aspects described herein (e.g., the 33rd, 34th, or 35th aspects), wherein both the first memory address and the decoy address are cached in a translation cache. In accordance with a 44th exemplary aspect of the present disclosure, which may be used in combination with any one or more of other aspects described herein (e.g., the 43rd aspect), wherein a first time elapsed accessing the first page table entry and a second time elapsed accessing an unused page table entry are both within a cache return time frame.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory including a first memory address and a second memory address of a plurality of memory addresses, wherein at least one of the plurality of memory addresses is a decoy address; and
a memory manager on one or more processors executing to:
generate a page table associated with the memory, wherein the page table includes a plurality of page table entries;
flag each page table entry in the plurality of page table entries as in a valid state;
instantiate the page table with a first page table entry and a second page table entry of the plurality of page table entries associated with the first memory address and the second memory address respectively such that the first memory address and the second memory address are allocated;
flag the first memory address's and the second memory address's access rights as accessible;
associate a plurality of unused page table entries of the plurality of page table entries, including a decoy page table entry, with the decoy address;
write first data to the first memory address; and
after writing the first data to the first memory address, and while the first page table entry remains flagged as valid and also remains flagged as accessible;
deallocate the first memory address; and
update the first page table entry to reference the decoy address such that an access timing of the decoy address is the same as an access timing of the second memory address, wherein the decoy address comprises an address that returns a page fault.

2. The system of claim 1, wherein the second page table entry references kernel space data, and the first memory address is non-contiguous with the second memory address.

3. The system of claim 2, wherein the second page table entry is subsequently unassociated with the second memory address and associated to the decoy address.

4. The system of claim 1, wherein a first virtual memory address is randomly selected and the first virtual memory address is associated with the first page table entry and with the first memory address, and wherein upon reinitialization of the page table, the first page table entry is associated with a different second virtual memory address.

5. The system of claim 1, wherein the plurality of page table entries is generated based on a request to allocate a virtual memory address.

6. The system of claim 1, wherein accessing an unused page table entry referencing the decoy address triggers an error and access to the decoy address is protected from at least one of read access, write access, execute access, and unprivileged access.

7. The system of claim 1, wherein both the first memory address and the decoy address are cached in a translation cache and a first time elapsed accessing the first page table entry and a second time elapsed accessing an unused page table entry are both within a cache return time frame.

8. A method comprising:
generating a page table associated with a memory, wherein the page table includes a plurality of page table entries;
flagging each page table entry in the plurality of page table entries as in a valid state;
instantiating the page table with a first page table entry and a second page table entry of the plurality of page table entries associated with a first memory address of a plurality of memory addresses and a second memory address of the plurality of memory addresses respectively such that the first memory address and the second memory address are allocated;
flagging the first memory address's and the second memory address's access rights as accessible;
associating a plurality of unused page table entries of the plurality of page table entries, including a decoy page table entry, to a decoy address of the plurality of memory addresses;
writing first data to the first memory address; and
after writing the first data to the first memory address, and while the first page table entry remains flagged as valid and also remains flagged as accessible:
deallocating the first memory address; and
updating the first page table entry to reference the decoy address such that an access timing of the decoy address is the same as an access timing of the second memory address, wherein the decoy address comprises an address that returns a page fault.

9. The method of claim 8, further comprising:
associating the second page table entry to the decoy address.

10. The method of claim 8, wherein a first virtual memory address is randomly selected and the first virtual memory address is associated with the first page table entry and with the first memory address, the method further comprising:
reinitializing the page table; and
associating the first page table entry with a different second virtual memory address.

11. The method of claim 8, further comprising:
triggering an error based on accessing one of an unused page table entry and the decoy page table entry.

12. The method of claim 8, wherein both the first memory address and the decoy address are cached in a translation cache and a first time elapsed accessing the first page table entry and a second time elapsed accessing an unused page table entry are both within a cache return time frame.

13. A system comprising:
a memory including a plurality of memory addresses, wherein at least one of the plurality of memory addresses is a decoy address;
a page table including a plurality of page table entries, wherein each page table entry in the page table is flagged as valid and each page table entry is associated with a memory address of the plurality of memory addresses;
a memory manager on one or more processors executing to:
create a first page table entry of the plurality of page table entries referencing a first memory address of the plurality of memory addresses such that the first memory address is allocated;
flag the first memory address's access rights as accessible;
write first data to the first memory address, and after writing the first data to the first memory address, and while the first page table entry remains flagged as valid and also remains flagged as accessible:
receive a command to delete the first data;
deallocate the first memory address;
update the first page table entry to reference the decoy address of the plurality of memory addresses such that an access timing of the decoy address is the same as an access timing of a second memory address, wherein the decoy address comprises an address that returns a page fault;

receive a request to access the first page table entry; and respond to the request with a rejection.

14. The system of claim 13, wherein the first page table entry references kernel space data, a second page table entry of the plurality of page table entries references user space data, and accessing the first page table entry from a user space generates an error.

15. The system of claim 13, wherein each page table entry of the plurality of page table entries is associated with one of a respective data address and a respective decoy address.

16. The system of claim 13, wherein a first virtual memory address is randomly selected, the first virtual memory address is associated with the first page table entry and with the first memory address, and a second virtual memory address associated with a second page table entry of the plurality of page table entries is non-contiguous with the first virtual memory address.

17. The system of claim 13, wherein accessing an unused page table entry referencing the decoy address triggers an error.

18. The system of claim 13, wherein access to the decoy address is protected by access credentials controlling at least one of read access, write access, execute access, and unprivileged access.

19. The system of claim 13, wherein both the first memory address and the decoy address are cached in a translation cache, and wherein the decoy address is permanently cached in the translation cache.

20. The system of claim 13, wherein a first time elapsed accessing the first page table entry and a second time elapsed accessing an unused page table entry are both within a cache return time frame.

* * * * *